Patented Jan. 19, 1954

2,666,778

UNITED STATES PATENT OFFICE 2,666,778

METHOD FOR THE SYNTHESIS OF ORGANIC PHOSPHATES

George M. Steinberg, Baltimore, Md., assignor to the United States of America as represented by the Secretary of the Army No Drawing. Application May 10, 1950,
Serial No. 161,273

4 Claims. (Cl. 260—461)

(Granted under Title 35, U. S. Code (1952),
sec. 266)

The invention described herein may be manufactured and used by or for the Government for governmental purposes without the payment to me of any royalty thereon.

This invention relates generally to a method of converting an organic phosphite into an organic phosphate ester. More specifically the invention is directed to a method of phosphorylating an alcohol with an organic phosphite in the presence of carbon tetrachloride and a tertiary amine.

It has long been desirable to find a method of converting organophosphorus compounds of the phosphite type into the phosphate type as this would serve as a desirable method of introducing an additional organic radical into the organophosphorus compound. Further and more important was the desirability of converting organophosphorus compounds composed of unsaturated hydrocarbons into phosphates while maintaining the hydrocarbon members in their unsaturated condition. The product of such a reaction could have one, two or three unsaturated hydrocarbons depending upon the organic phosphite employed. Such a produce would be capable of undergoing polymerization to form a new group of synthetic resins.

Atherton et al. reported in 1945 and 1947 (Journal Chemical Society) that they could phosphorylate ammonia or an amine to produce organophosphoryl amides of the structure

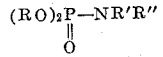

where R' and R" may be either organic radicals or hydrogen. The phosphorylation was carried out by the reaction of an organic phosphite with ammonia or the amine in the presence of carbon tetrachloride. However, attempts to phosphorylate an alcohol in this manner have been unsuccessful.

I have found that by reacting an organic phosphite with an alcohol in the presence of a completely chlorinated aliphatic hydrocarbon and a low boiling tertiary amine it is possible to form the organic phosphate ester.

It is an object of this invention to provide an improved process of preparing an organic phosphate ester from an organic phosphite.

Another object is to provide an improved process of preparing an organic phosphate ester, having therein unsaturated hydrocarbon radicals from an organic phosphite.

These and other objects will be apparent to those skilled in the art as the description of the invention proceeds.

The process employed comprises generally in reacting the organic phosphite and the alcohol in the presence of carbon tetrachloride and a low boiling tertiary amine. A mixture of the phosphite, organo chloride, and alcohol are cooled and to this mixture is slowly added the tertiary amine. The mixture is stirred throughout the reaction, which requires about three hours time. The temperature of the reactants is maintained initially at 0° centigrade and after a period of time, permitted to raise to room temperature or heat is added, if necessary. The resultant product is then purified by filtration and distillation.

While the exact mechanism is not understood, it is generally believed that the alcohol reacts with an unstable intermediate to produce the ester. Atherton et al. believed that the organic phosphite reacted with the organo chloride to form a chloro organic phosphate as an unstable intermediate and this compound in turn phosphorylated the alcohol. Such a belief was supported by the fact that they successfully prepared the pyrophosphates with aromatic organo phosphites. However, all attempts to phosphorylate the alcohols using carbon tetrachloride failed and this cast doubts on the foregoing reaction theory. On the other hand, Atherton was able to form the ester by the use of trichlorobromo methane in place of carbon tetrachloride. It would, therefore, appear that different intermediates are formed when different organo halides are used. In my invention, it appears that both the carbon tetrachloride and tertiary amine enter into the reaction. The amount of carbon tetrachloride required is 1 mol per mol of phosphite, and similarly 1 mol of the tertiary amine is required per mol of phosphite. In addition to the above I have found it advisable to use a slight excess over that which is stoichiometrically required. The requirement is postulated on a presumption that the reaction between the phosphite and alcohol proceeds according to the equation

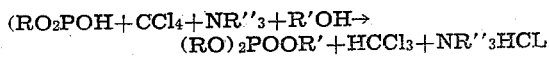

where R, R', and R" may be the same or different radicals. While the foregoing reaction theory is an attempt to explain the mechanism, it is to be understood that it is offered as possible explanation only and in no way limits my invention.

My invention, as will be seen from the following examples, is directed to reacting an organic phosphite with an alcohol in the presence of carbontetrachloride and a low boiling tertiary amine. The well known amines which came within this definition are trimethyl amine which boils at 3.5°

C., triethyl amine which boils at 85° C., and tripropyl amine which boils at 156° C. However, mixed low boiling amines could conceivably be employed and come within the scope of this invention. When employing the low boiling amines like trimethyl amine, it is, of course, necessary that the reaction be carried out at a low temperature or in an enclosed pressure tight vessel.

*Example 1*

To a mixture of 27.6 grams of diethyl phosphite, 35 ml. of carbon tetrachloride and 16.3 grams of n butanol, there was added 31.6 ml. of triethylamine. The mixture was refluxed and stirred for three hours. It was then filtered, vacuum stripped and distilled. There was obtained 22 grams of diethyl butyl phosphate; B. 100–101$_{2-3\,mm.}$, $n_D^{20}$ 1.4085.

*Example 2*

32.4 grams of diallyl phosphite were mixed with 20 ml. of carbon tetrachloride and 12 ml. of ethanol. The mixture was cooled to 0° C. To this cooled mixture was added 41.7 ml. of triethylamine dropwise. The mixture was kept at 0° C., for thirty minutes and then raised to room temperature (25° C.) and stirred for several hours. The resultant product was filtered, vacuum stripped and distilled. In order to prevent polymerization of this end product and to tie up any remaining base, hydroquinone and potassium dihydrogen phosphate were added to the mixture prior to the distillation. There was obtained 14 grams of diallyl ethylphosphate B. 72° C$_{1-2\,mm.}$, $n_D^{20}$ 1.4350. It was noted that despite the above precautions, a large quantity of polymerized material was formed.

From the foregoing examples, it is clear that it is possible to form compounds of the formula

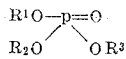

wherein R$^1$, R$^2$ and R$^3$ may be the same or different organic radicals and may all be saturated or unsaturated, alkyl or aryl. For example, if the diallyl phosphite above was reacted with allyl alcohol, the resultant product would be triallyl phosphate.

Having described my invention, I claim:

1. A method of forming an organic phosphate of the formula

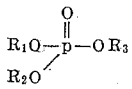

wherein R$_1$, R$_2$ and R$_3$ are open chain hydrocarbon radicals which comprises reacting an organic phosphite of the formula

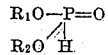

with an alcohol of the formula R$_3$OH in the presence of a minimum of approximately molecular equivalents of carbon tetrachloride and a tertiary amine from the group consisting of tripropyl amine, triethyl amine and trimethyl amine where said equivalents are equal to the stoichiometric quantity of the phosphite.

2. A method of forming an organic phosphate of the formula

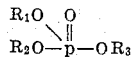

wherein R$_1$, R$_2$ and R$_3$ are open chain unsaturated hydrocarbons, which comprises reacting an organic phosphite of the formula

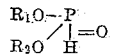

with an alcohol of the formula R$_3$OH in the presence of a minimum of approximately molecular equivalents of the carbon tetrachloride and a tertiary amine from the group consisting of tripropyl amine, triethylamine and trimethylamine where said equivalents are equal to the stoichiometric quantity of the phosphite.

3. A method of forming dialkyl ethyl phosphate which comprises reacting dialkyl phosphite with ethyl alcohol in the presence of a minimum of approximately molecular equivalents of carbon tetrachloride and a tertiary amine from the group consisting of tripropyl amine, triethylamine and trimethyl amine, where said equivalents are equal to the stoichiometric quantity of the dialkyl phosphite.

4. A method of forming an organic phosphate according to claim 1, wherein the tertiary amine is triethylamine.

GEORGE M. STEINBERG.

References Cited in the file of this patent

UNITED STATES PATENTS

| Number | Name | Date |
|---|---|---|
| 2,176,416 | Britton et al. | Oct. 17, 1939 |
| 2,394,829 | Whitehill et al. | Feb. 12, 1946 |

OTHER REFERENCES

Atherton et al., J. Chem. Soc., pages 674–678 (1947).

Topley, Chem. and Ind., Supp. Vol., page S864, Dec. 30, 1950 (entire article, pages S859–880).